US007536449B2

(12) United States Patent
Melo et al.

(10) Patent No.: US 7,536,449 B2
(45) Date of Patent: May 19, 2009

(54) SERVER-FUNCTIONALITY ROLE EXTENSIBILITY MODEL

(75) Inventors: Eduardo D. Melo, Bellevue, WA (US); Edward T. French, Redmond, WA (US); Saif R. Hasan, Redmond, WA (US); Bryan K Walton, Sammamish, WA (US); Cheryl A. Evans, Snoqualmie, WA (US); Frank M. Sager, Kingston, WA (US)

(73) Assignee: Microsoft Corporation, Redmond, WA (US)

( * ) Notice: Subject to any disclaimer, the term of this patent is extended or adjusted under 35 U.S.C. 154(b) by 811 days.

(21) Appl. No.: 11/056,416

(22) Filed: Feb. 11, 2005

(65) Prior Publication Data
US 2006/0184654 A1 Aug. 17, 2006

(51) Int. Cl.
*G06F 15/177* (2006.01)

(52) U.S. Cl. .................. 709/220; 709/217; 709/219; 709/221; 709/222; 709/223; 709/224; 709/226

(58) Field of Classification Search ............. 709/217, 709/219–224, 226
See application file for complete search history.

(56) References Cited

U.S. PATENT DOCUMENTS

| 2001/0054106 A1* | 12/2001 | Anderson et al. ........... 709/227 |
| 2002/0112038 A1* | 8/2002 | Hessmer et al. ............ 709/220 |
| 2004/0123153 A1* | 6/2004 | Wright et al. .............. 713/201 |
| 2005/0066157 A1* | 3/2005 | Korbatits ...................... 713/1 |
| 2005/0114692 A1* | 5/2005 | Watson-Luke et al. ...... 713/200 |
| 2006/0106866 A1* | 5/2006 | Green et al. ............. 707/104.1 |

\* cited by examiner

*Primary Examiner*—Liangche A Wang
(74) *Attorney, Agent, or Firm*—Lee & Hayes, PLLC

(57) ABSTRACT

Described herein are one or more implementations facilitating the extensibility of a tool for configuration and management of server-functionality role(s) of a network server. One or more implementations, described herein, provide an extensibility model that allows additional server-functionality roles to be included in the list of user-selectable server-functionality roles available on a server. When selected by user, the model enables management and configuration of the additional server-functionality roles.

12 Claims, 7 Drawing Sheets

(background)

SERVER-FUNCTIONALITY ROLE EXTENSIBILITY MODEL

TECHNICAL FIELD

This invention generally relates to a technology offering defined network server-functionality roles.

BACKGROUND

A network server is a computer or device on a computer network that manages network resources. A network server (or simply "server") may run a server-specific multipurpose operating system capable of handling a diverse set of server-functionality roles (such as Microsoft® Windows® Server 2003™ server-specific multipurpose operating system).

A network server may fulfill one or more server-functionality roles. The following are examples of these server-functionality roles (provided by way of example and not limitation):

- "file server" manages network-accessible storage systems for storing files thereon;
- "print server" manages network-accessible printers;
- "traffic control" server manages traffic over a network;
- "database server" processes database queries and manages one or more databases; and
- "mail server" manages email communications.

Until recently, configuring a server to perform one of these server-functionality roles was a technical procedure requiring a knowledgeable and skillful network administrator ("net-admin"). In order to perform a specific server-functionality role (or combination of roles), a net-admin must know and install the correct, specific requisite functional components. Functional components include, for example, program modules, drivers, application program interfaces (APIs), and the like.

Furthermore, the net-admin must know exactly what configuration data that must be adjusted, added, or removed in order to enable the desired server-functionality role(s) in the server. Then, of course, the net-admin must make those adjustments to the existing configuration data, add the new and necessary configuration data, and remove the unnecessary and old configuration data.

Numerous network administration tomes have been published to instruct the net-admin as to which functional components, amongst a group of seemingly unrelated components, are required for each role (and combinations of roles). In addition, these tomes teach how to configure the server for each role (and combinations or roles). These net-admins have spent countless hours in training sessions in hopes of gaining the requisite knowledge, and honing the essential skills for configuring a server to perform the roles most desired by each industry, and then managing that server once it is performing the desired roles.

However, network servers employing more recent and modern network server operating systems (such as Microsoft® Windows® Server 2003™ server operating system) provide a server-functionality role configuration and management tool. With this tool, a net-admin configures and manages desired server-functionality roles by selecting the desired roles from a list of such roles.

FIG. 1 shows an example user-interface (UI) 100 of a server employing a server-functionality role configuration and management tool displayed on a monitor 110. At 120, the UI 100 lists several selectable options from which net-admin may choose the desired server-functionality roles. As shown, list 120 includes file server, print server, web server, and mail server.

For this example, assume that the net-admin selects the "print server" option in the UI 100. In response to that selection, the tool automatically installs the specific requisite functional components for the print server role, and the tool adjusts the configuration accordingly.

For some roles, the tool asks for user input for some role-specific settings. For some of these settings, default values can be provided by the tool and the user can simply accept the default values as they tend to be the most appropriate ones for typical deployment.

Rather than relying on the skill and knowledge of the net-admins to properly add, remove and manage the desired server-functionality role(s), by picking and choosing from a seemingly unrelated list of functional components and configuration data, the customer may now rely on this tool to install and configure a server to perform desired role(s). The net-admin merely selects the desired role(s) from amongst a list of roles (and maybe answers a few customization questions). The tool does the rest.

Moreover, once the role is installed and configured, the tool may inform the user about that and provide a list of common management tasks along with links to user education material so that the net-admin can learn more about the selected roles.

SUMMARY

Described herein are one or more implementations facilitating the extensibility of a tool for configuration and management of server-functionality role(s) of a network server. One or more implementations, described herein, provide an extensibility model that allows additional server-functionality roles to be included in the list of user-selectable server-functionality roles available on a server. When selected by user, the model enables management and configuration of the additional server-functionality roles.

BRIEF DESCRIPTION OF THE DRAWINGS

The same numbers are used throughout the drawings to reference like elements and features.

DETAILED DESCRIPTION

Some network-server operating systems supply a software tool for configuration and management of server-functionality roles of a network server. Conventionally, that tool has a finite number of pre-defined and built-in server-functionality roles. The following description sets forth techniques facilitating extensibility to the tool so that the tool may offer additional server-functionality roles.

Exemplary Tool for Configuration and Management Server-Functionality Role

Figure 2:
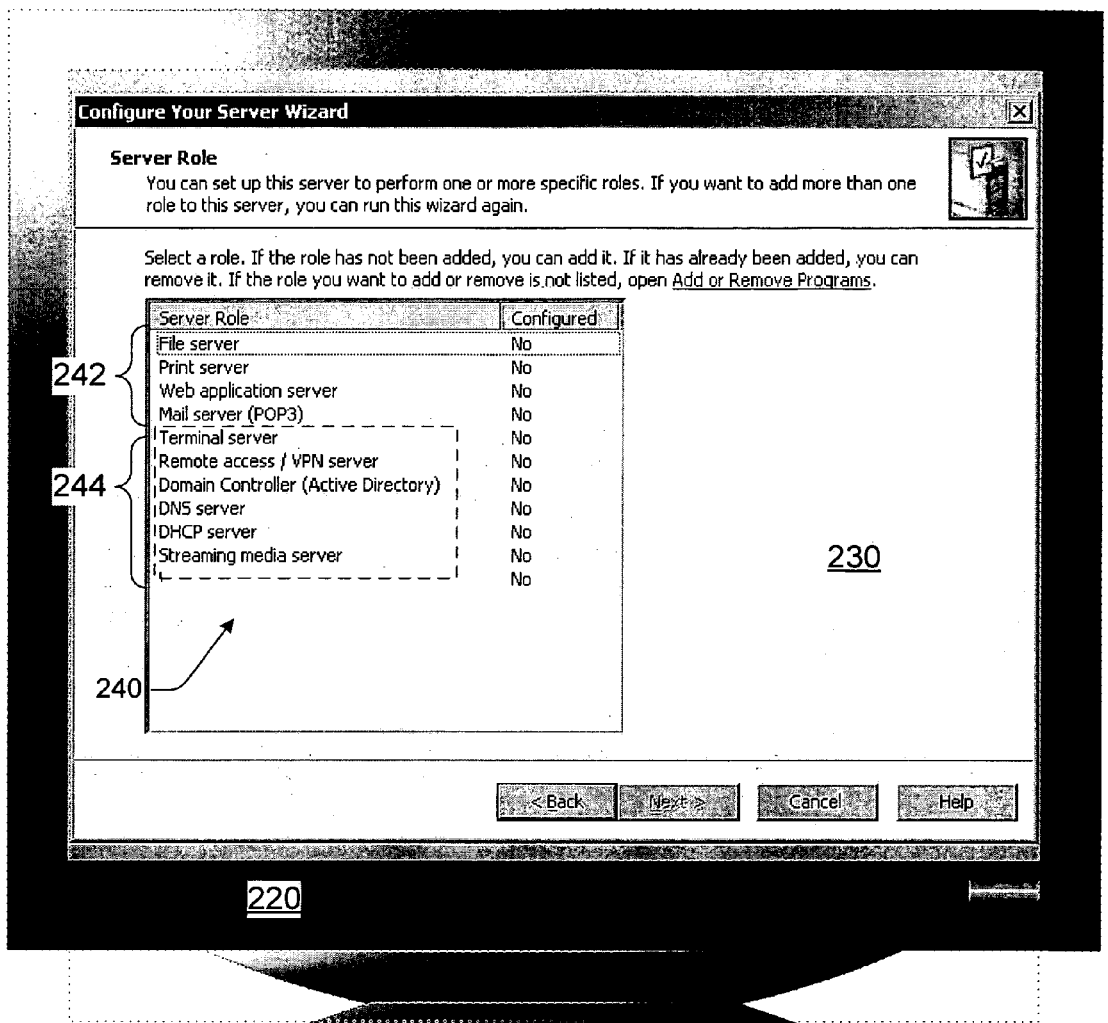
FIG. 2 shows an example of a user-interface (UI) of a software tool for configuration and management of server-functionality roles of a network server. This tool and its UI are in accordance with at least one implementation described herein.
Figure 2:
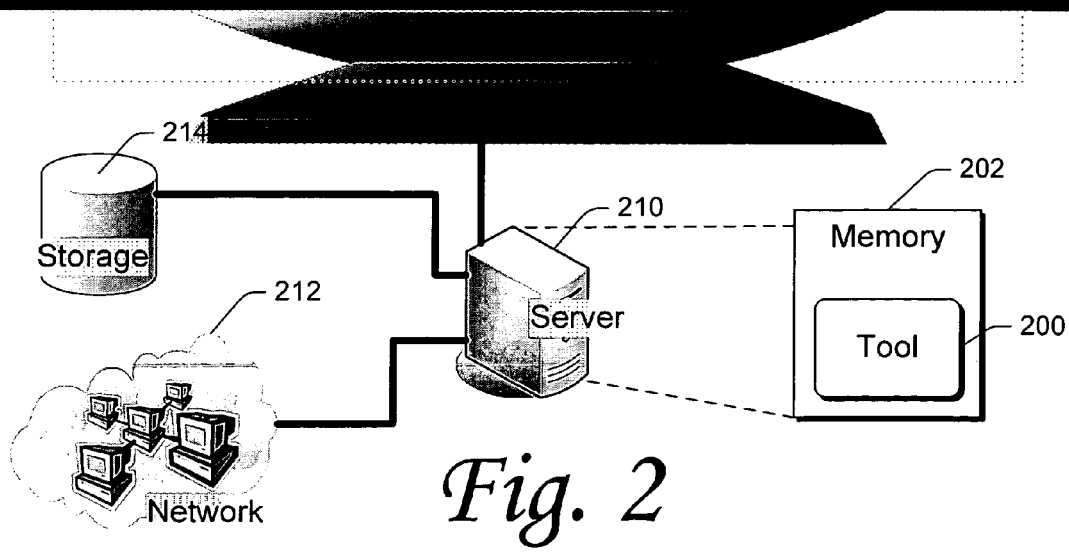
Figure 7:
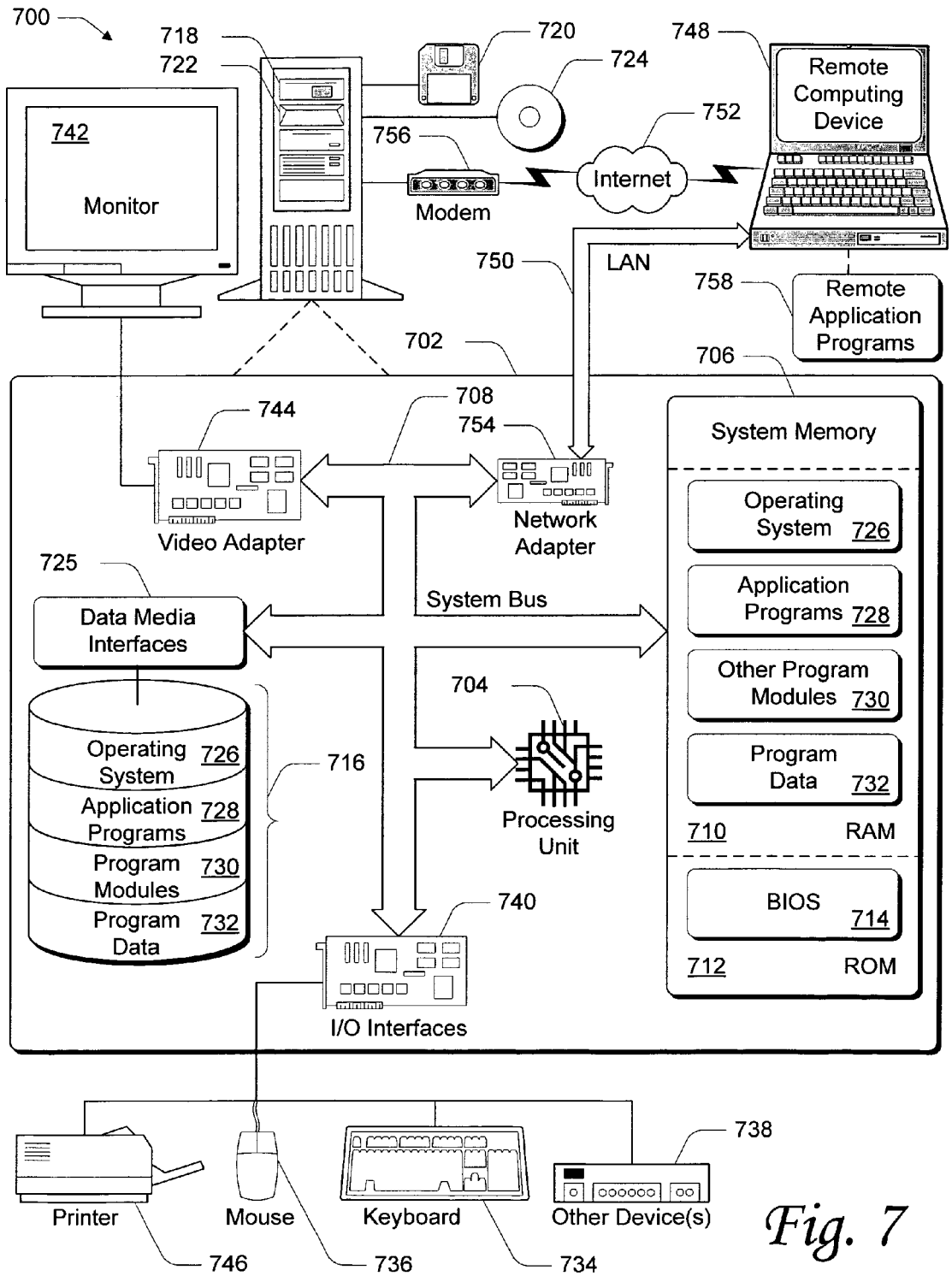
FIG. 7 is an example of a computing operating environment capable of (wholly or partially) implementing at least one embodiment described herein.

FIG. 2 shows an example of a software tool 200 for configuration and management of server-functionality roles of a network server, as described herein, in the context of a network server being configured and/or managed by a network administrator ("net-admin"). The server-functionality role configuration and management tool 200 itself is, for example, a program module executing within a primary memory system 202 (e.g., volatile or non-volatile memory) of a server 210. This server may be a general- or special-purpose computer in this illustrated scenario. FIG. 7 depicts another computer system on which the tool 200 may operate.

The server 210 may be running a server-specific multipurpose operating system ("server OS") capable of handling a diverse set of server-functionality roles (such as Microsoft® Windows® Server 2003™ server-specific multipurpose operating system). The tool 200 may be an integrated portion of the server OS or a separate but cooperative program module.

As depicted in FIG. 2, the server 210 is coupled to a network 212 (e.g., a local area network (LAN), wide area network (WAN), the Internet, an intranet, etc.). The server also has access to a storage system 214 for storing files, data, etc. The server is connected to a computer monitor 220 for displaying, for example, a user-interface (UI) 230.

The UI 230 is an example of just one UI generated by the tool 200 during the configuration and management of server-functionality roles of the server 210 (or another server). This UI displays a list 240 of the server-functionality roles available for configuration and/or management.

For this example, assume that the net-admin selects the "print server" option from the list 240 in the UI 230. In response to that selection, the tool 200 automatically installs the specific requisite functional components for the server 210 to now operate as a print server, and the tool adjusts the server's configuration accordingly.

The list 240 in the UI 230 lists the following examples of server-functionality roles (provided by way of example and not limitation) that may be configured and/or managed by the tool 200:

File Server manages network-accessible storage systems for storing files thereon;

Print Server manages network-accessible printers;

Web Application Server manages applications which provide services via the Internet;

Mail Server manages email communications;

Terminal Server manages multiple access from multiple remote-terminal users;

Remote Access/Virtual Private Network (VPN) Server manages routing and remote access;

Domain Controller manages network directory data and communication between users and domains, including user logon processes, authentication, and directory searches;

Domain Name System (DNS) Server manages TCP/IP name resolution service that is used on the Internet;

Dynamic Host Configuration Protocol (DHCP) Server manages the complexity of administering address configurations; and Streaming Media Server manages streaming of media over a network.

Although not shown in FIG. 2, the following are examples of other server-functionality roles that the tool 200 may offer (this is non-exhaustive and is provided for example purposes only; of course, other examples may exist.):

Chat Servers manage exchange information between users in a real-time discussion mode;

Fax Servers manage incoming and outgoing telephone facsimile resources;

File-Transfer-Protocol (FTP) Servers manage secure file transfers (using FTP) between computers, while providing file security and organization as well as transfer control;

Groupware Servers manage user collaboration, regardless of location, via the Internet or a corporate intranet;

Traffic Control Server manages traffic over a network;

Database Server processes database queries and manages one or more databases;

Proxy Servers manage traffic between a client and an external server to filter requests, improve performance, and share connections; and Web Servers manage delivery of static or dynamic content to a user's Web browser.

Figure 1:
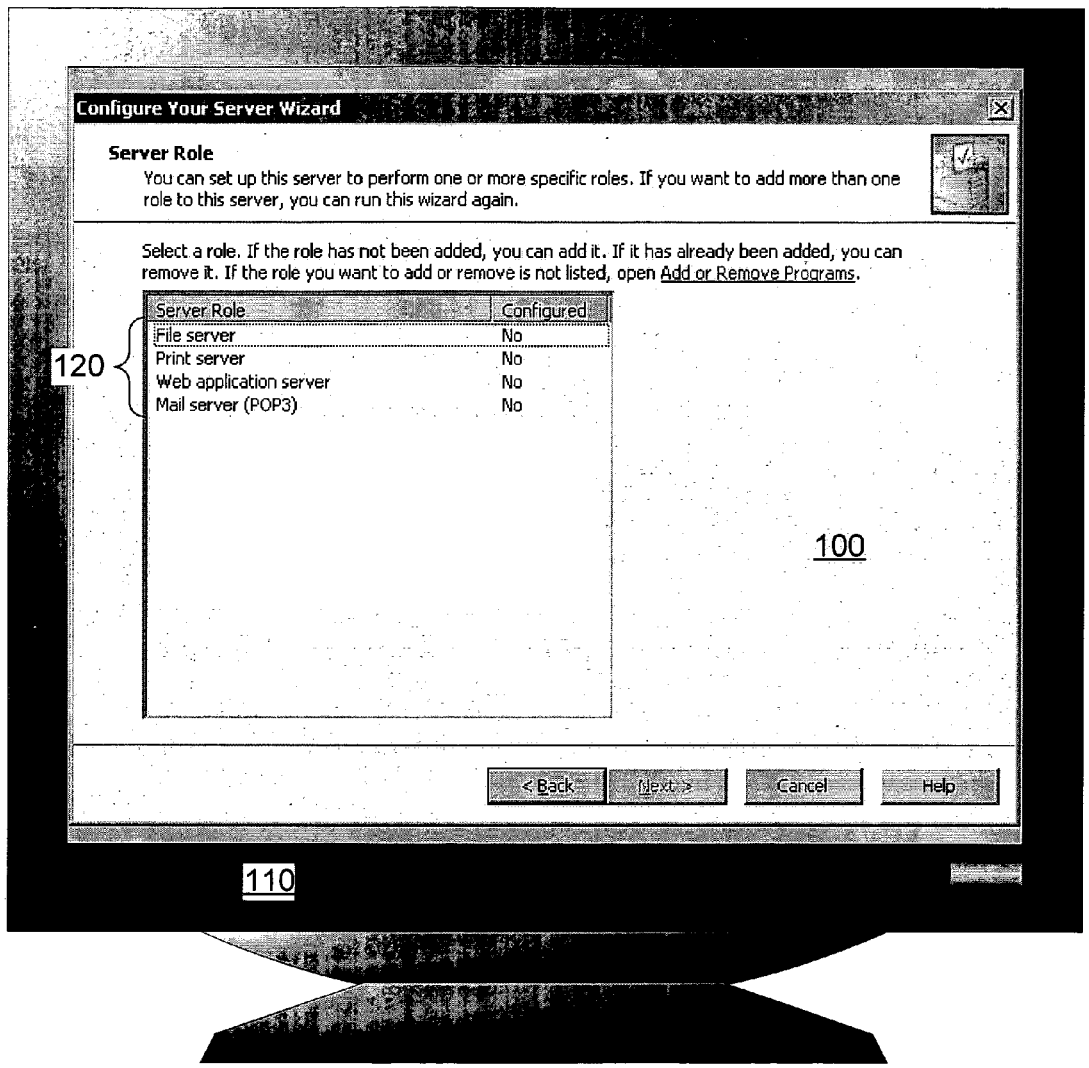
FIG. 1 shows an example of a user-interface (UI) of a conventional software tool for configuration and management of server-functionality roles of a network server.

While the net-admin sees a continuous list of available server-functionality roles, the list 240 of the UI 230 is bifurcated for illustration purposes. Sub-list 242 includes the finite number of server-functionality roles that are pre-defined in and built into the tool 200. The contents of the sub-list 242 correspond to the contents offered by the conventional approach shown in list 120 of the UI 100 of FIG. 1. That is because both the sub-list 242 and the list 120 offer the finite number of the pre-defined and built-in roles. FIG. 2 shows the members of each sub-list as being segregated from the members of the other sub-list. However, in other implementations, the members of the two sub-lists may intermix.

Conventionally, the programming for each listed server-functionality role is "hard-coded" (i.e., built into the software in a way, which is not easily modified) into a server-functionality role configuration and management tool. Therefore, according to convention, adding new roles in the tool required changes to the tool's "core binaries." This is an expensive task for development and test teams. Furthermore, the development and test teams of the tools are typically not the best suited and trained to understand how best to implement a particular server-functionality role on a server.

The server-functionality role configuration and management tool 200 introduces an extensibility model that allows the inclusion of additional (i.e., "non-built-in" or "extension") roles offered by the tool. While sub-list 242 of the UI 240 includes the available built-in roles, sub-list 244 (shown in a dashed-line box) includes additional roles available to the net-admin for selection. When an additional server-functionality role is selected by the net-admin, the tool 200 facilitates the management and configuration of the selected additional role.

Instead of having all the roles hard-coded in the binaries of the tool 200, the tool exposes additional roles dynamically.

The tool employs an extension model that allows roles to be defined in stand-alone binaries (e.g., DLLs). Once the tool is aware of the extension binary of a new role (registered, for example, to the server OS), the tool automatically exposes the new role.

Figure 3:
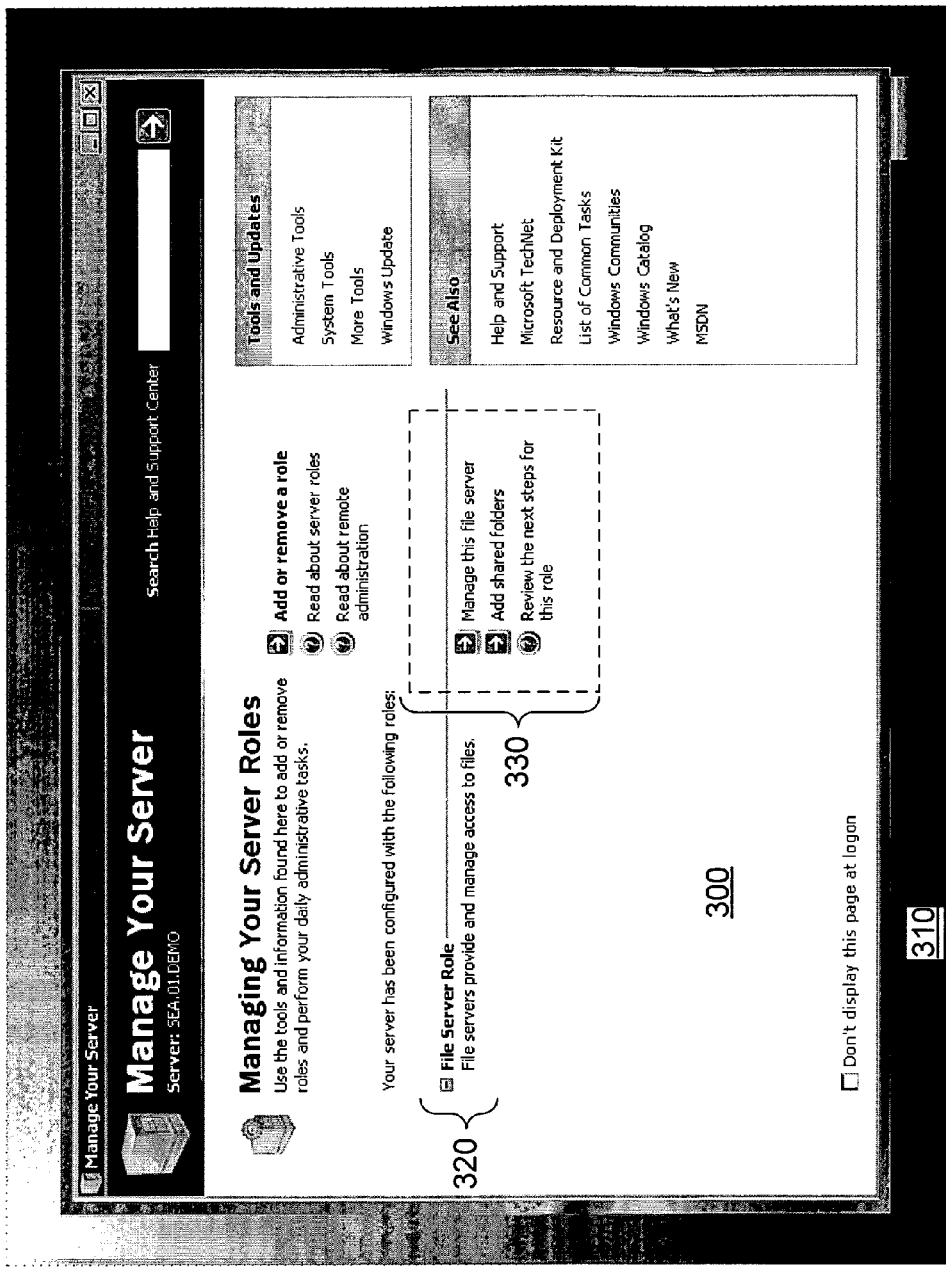
FIG. 3 shows an example of a UI, in accordance with at least one implementation described herein.

FIG. 3 shows an example of another UI 300 displayed on a monitor 310. The tool 200 may generate this UI 300, which may be employed for managing already-installed and configured server-functionality roles on the server.

At 320, the UI 300 displays the already-installed and configured server-functionality roles on the server. At 330, the UI 300 displays related information associated with already-installed and configured server-functionality roles on the server. That information may include links to more detailed information or other functionality.

Exemplary Server-Functionality Role Configuration and Management Tool

Figure 4:
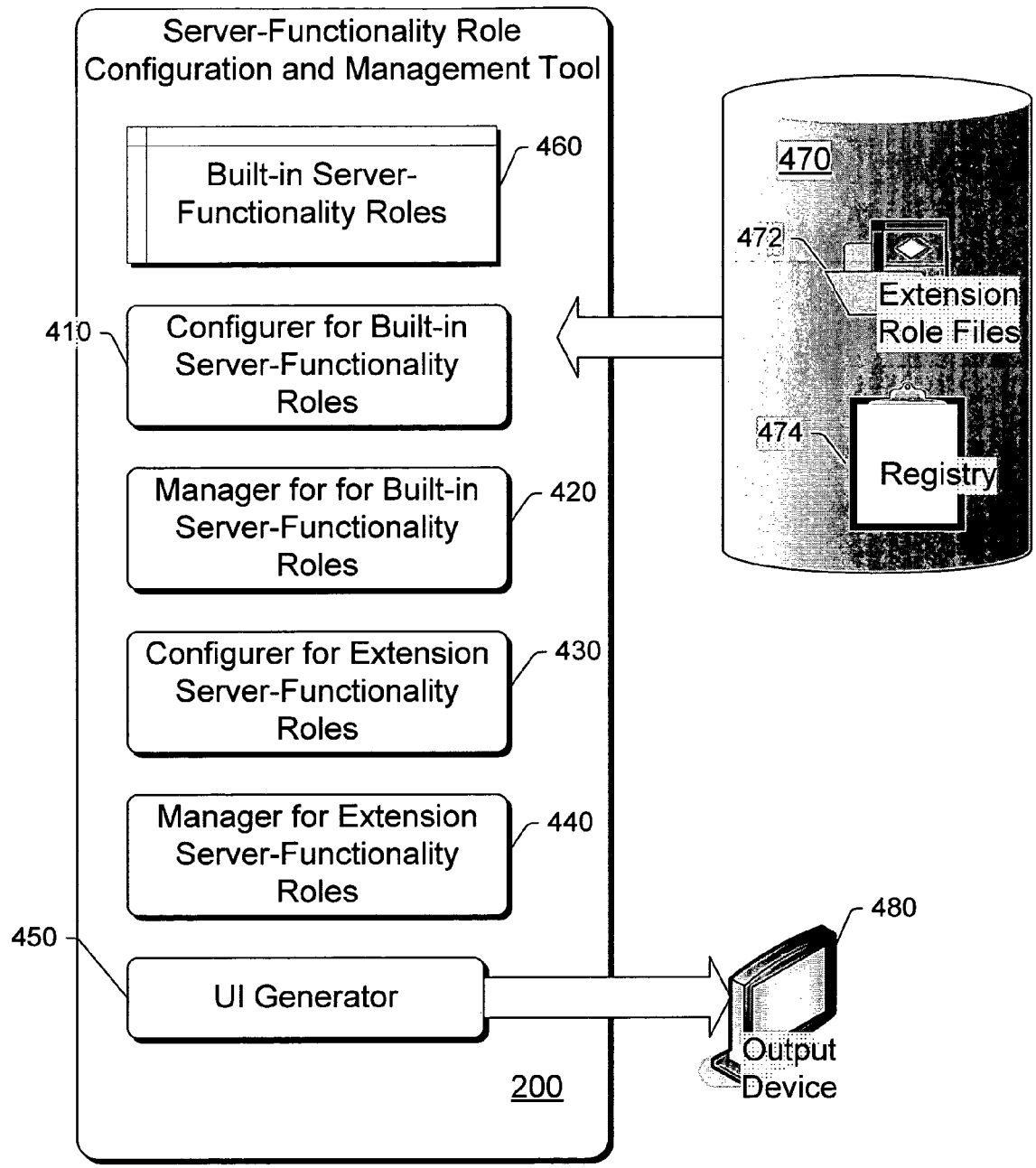
FIG. 4 shows operational components of an exemplary tool for configuration and management of server-functionality roles, in accordance with at least one implementation described herein.

FIG. 4 illustrates operational components of the server-role management tool 200. Because this is the same server-role management tool 200 discussed and referenced in FIG. 2, the tool shown in FIG. 4 retains the 200 reference designator. Although the operational components of FIG. 4 are shown as being part of the tuner 200, those of ordinary skill in the art understand that each operational component and sub-component may be incorporated into one or more entities other than the tool.

As shown in FIG. 4, the components of the server-role management tool 200 include a built-in server-role configurer 410, a built-in server-role manager 420, an extension server-role configurer 430, an extension server-role manager 440, and a UI generator 450.

Both the built-in server-role configurer 410 and the built-in server-role manager 420 analyze the existing built-in server-functionality roles and determine which ones are already installed. To do that, the built-in configurer 410 examines the built-in server-functionality roles portion 460 of the tool 200. This portion 460 may have been loaded when the tool was loaded, or it may be stored at a known and accessible storage location. This portion includes information about each built-in role and the configuration and management functionality associated with each built-in role.

The built-in server-role configurer 410 handles the initial configuration (e.g., installation) of each built-in role. Once a built-in role is installed, the built-in server-role manager 420 handles management of the built-in role. That management may include customization of the role or un-installation of the role.

The extension server-role configurer 430 discovers what extension server-functionality roles exist by, for example, examining the registry 474 (which are configuration files that are typically stored on a computer storage 470). The extension server-role configurer 430 loads files (e.g., extension role files 472) associated with each registered extension server-functionality role from, for example, the computer storage 470. If an available extension role is not already loaded, the extension server-role manager 440 loads files associated with each already-installed extension server-functionality role from, for example, the extension role files 472 of the computer storage 470.

In addition, the extension server-role configurer 430 acquires descriptive data for each extension server-functionality role by, for example, querying role-associated files and/or extracting from the registry. That data may include, for example, a role's name and description.

The extension server-role manager 440 discovers what extension server-functionality roles are already installed. The extension server-role manager does not need to have any role-specific logic for discovering what roles are installed. The extension server-role manager may, for example, call into an appropriate function in the extension role files 472 to ask the role if it is installed. In this way, the role manager may be independent of the specific logic used to determine if a role is installed or not.

In addition, the extension server-role manager 440 acquires role-management information for each extension server-functionality role by, for example, querying role-associated files and/or extracting from the registry. That information may include links to other functionality or links to other information.

The UI generator 450 displays a merged list containing both the built-in roles and the extension roles. The server-role management tool 200 may enforce a policy to determine or allow individual roles to request/specify what order the roles should be listed in, in the merged list. If so, the generated UI will display the roles in the requested/specified order.

The generated UI may indicate whether a role is installed. During configuration of a server, the UI generator 450 displays a configuration UI, like UI 240 of FIG. 2. During management of a server, the UI generator 450 displays a management UI, like UI 300 of FIG. 3.

If a user initiates a configuration of a particular extension server-functionality role, the extension server-role configurer 430 initiates extension server-role configuration, during which the files associated with the selected server-role presumably install and configure the selected role. The extension server-role configurer 430 acts as an interface between the tool 200 and the associated-files.

When a user initiates a configuration of a particular extension server-functionality role, the extension server-role configurer 430 initiates extension server-role configuration, during which the files associated with the selected server-role presumably install and configure the selected role. The extension server-role configurer 430 acts as an interface between the tool 200 and the associated-files of the role being configured.

When a user initiates a management of a particular extension server-functionality role, the extension server-role manager 440 initiates extension server-role management, during which the files associated with the selected server-role presumably facilitate management of the selected role. The extension server-role manager 440 acts as an interface between the tool 200 and the associated-files of the role being managed.

Methodological Implementations

Figure 5:
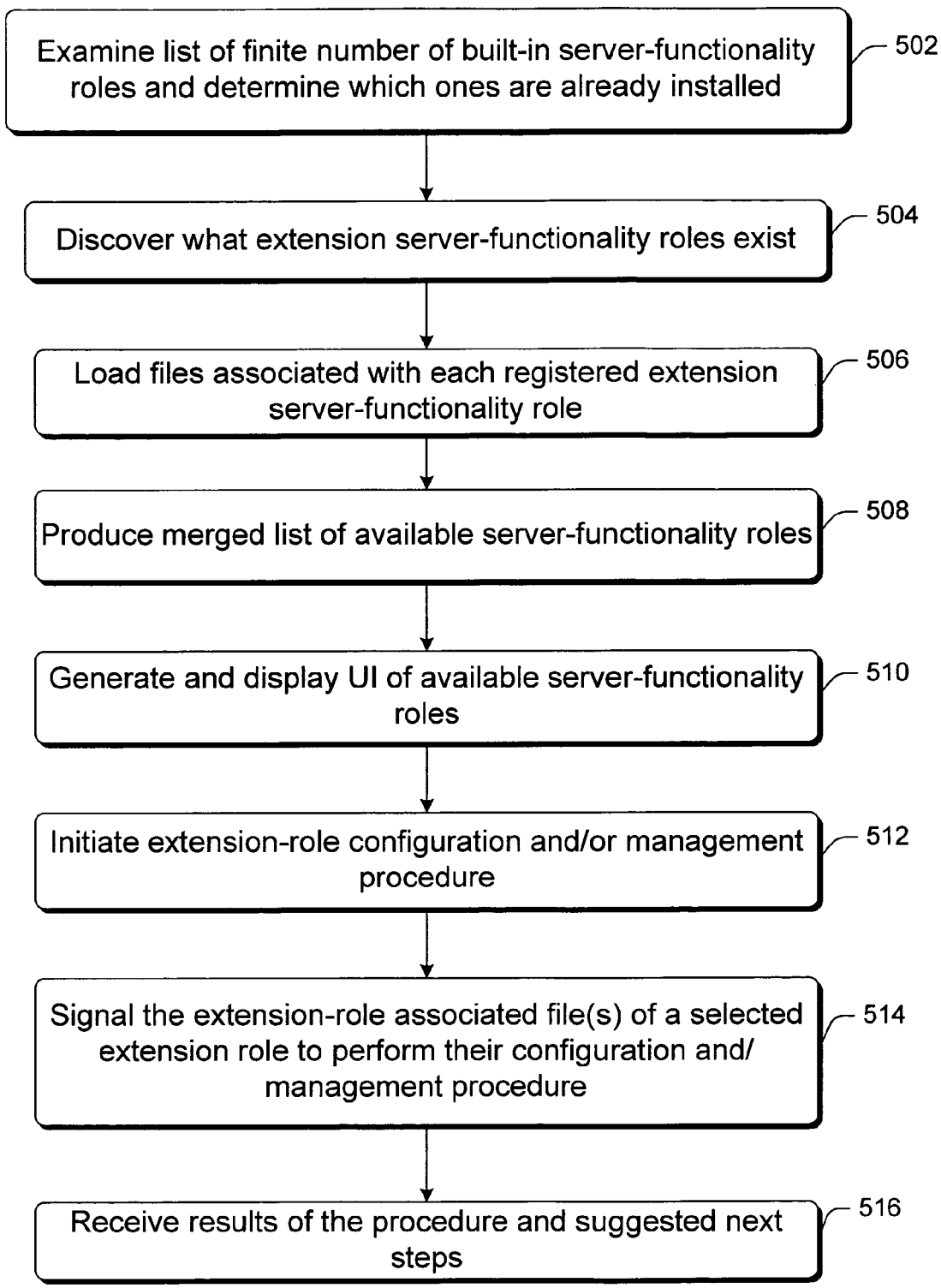
FIG. 5 illustrates a flow diagram showing a methodological implementation described herein.

FIG. 5 shows a server-functionality role configuration method 500 performed by the server-role management tool 200. In at least one example scenario, this configuration method 500 is performed during the initial installation and configuration of a network-server OS of a newly installed server (e.g., server 210).

This configuration method 500 may be performed in software, hardware, or a combination thereof. For ease of understanding, the method is delineated as separate steps represented as independent blocks in FIG. 5; however, these separately delineated steps should not be construed as necessarily order-dependent in their performance. Additionally, for discussion purposes, the method 500 is described with reference to FIG. 2.

As part of the initial installation and configuration, the server-role management tool 200 performs general initial checks of the network-server OS of a newly installed server (e.g., server 210).

At 502 of FIG. 5, the tool 200 examines the list of finite number of pre-defined and built-in server-functionality roles and determines which ones are already installed. Some editions of the network-server OS may automatically install one or more of the pre-defined and built-in server-functionality roles. The UI may indicate the installation status of the built-in roles.

At 504, the tool 200 discovers what additional server-functionality roles (i.e., "extension server-functionality roles") exist to extend the list of roles available for configuration and/or management. The tool examines one or more configuration files (e.g., the so-called "registry" of an operating system) in which additional server-functionality roles are defined in a manner that the tool can read and interpret. When properly listed in these configuration files, each extension server-functionality role is considered to be "registered."

At 506, the tool 200 loads the files (e.g., DLL files) associated with each registered extension server-functionality role. In addition, the tool acquires descriptive-data for each registered extension server-functionality role. The tool may do this by querying the associated files and/or by extracting the data from the configuration files.

The acquired descriptive-data for each registered extension server-functionality role may include the following (provided by way of example and not limitation): name of role, a short text description, and a placement-defining ordinal (which may be used to determine where the role appears in the list); a link to a help topic that will inform the user about that specific role, what it does, what the pre-requisites to install the role are, what to do after the installation; and installation status of role. Some editions of the network-server OS may automatically install one or more of the registered extension roles, and the UI may indicate the installation status of the registered server-functionality extension roles.

At 508, the tool merges the list of the pre-defined and built-in server-functionality roles and the list-registered extension roles into one common list, which lists all of the roles available for configuration or management and management on the server. List 240 of FIG. 2 is an example of this merged common list. As depicted in FIG. 2, this merged common list includes sub-list 242 of the pre-defined and built-in server-functionality roles and sub-list 244 of registered server-functionality extension roles. While FIG. 2 shows the members of each sub-list as being segregated from the members of the other sub-list, other implementations may have the members of the two sub-lists may intermixed.

At 510, the tool 200 generates and displays UI (e.g., UI 230 of FIG. 2) containing a list of server-functionality roles which are available for configuration and/or management. This list is the merged common list (e.g., list 240 of FIG. 2). Via the generated UI, a net-admin selects one of the server-functionality roles from the merged common list.

If the net-admin selects a built-in role, then the tool performs the pre-defined and built-in configuration and/or management for the selected built-in role. Since the configuration and/or management functionality for the registered extension roles are not built-in the tool, this functionality is derived from role-associated files (which were loaded at block 506).

In response to a net-admin selecting one of the registered server-functionality extension roles from the merged common list, the tool 200 initiates, at 512, extension-role configuration and/or management procedure. The tool queries the extension-role associated file(s) for UI, and the tool displays that UI.

At 514, the tool 200 signals the extension-role associated file(s) to perform the configuration and/management procedure for that registered server-functionality extension role.

While waiting for the extended configuration and/management procedure to complete, the tool receives progress information and displays such information on the UI.

At 516, the tool 200 receives the result of the extended configuration and/management procedure. The tool also receives a suggested next step for the net-admin to take to complete configuration and/or management of the registered server-functionality extension role. The tool displays the results and suggestions via a UI.

Figure 6:
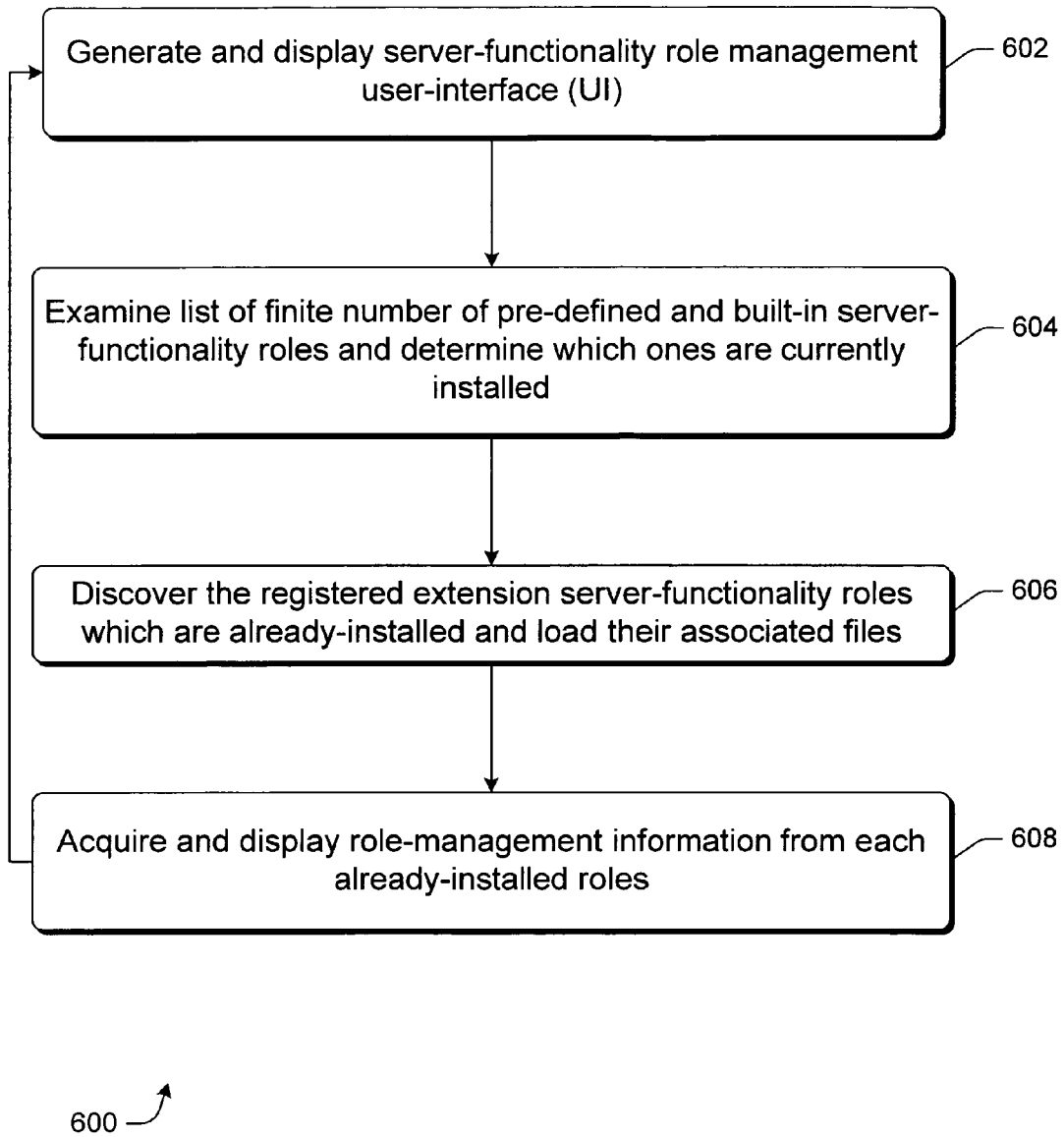
FIG. 6 illustrates a flow diagram showing a methodological implementation described herein.

FIG. 6 shows a server-functionality role management method 600 performed by the server-role management tool 200. In at least one example scenario, this management method 600 is performed at some time after the initial installation and configuration of a network-server OS of a newly installed server (e.g., server 210).

This management method 600 may be performed in software, hardware, or a combination thereof. For ease of understanding, the method is delineated as separate steps, represented as independent blocks in FIG. 6; however, these separately delineated steps should not be construed as necessarily order-dependent in their performance. Additionally, for discussion purposes, the method 600 is described with reference to FIGS. 2 and 3.

At 602 of FIG. 6, tool 200 generates and displays a server-functionality role management UI. The UI 300 is an example of a UI, generated and displayed by the tool here. The UI lists the already-installed and -configured server-functionality roles on the server. The UI lists both the built-in and the extended roles.

The tool perform the functions of blocks 604-608 periodically (e.g., every fifteen seconds) or in response to a trigger (e.g., user input). Using the results of those functions, the tool updates the content of the server-functionality role management UI as necessary.

At 604, the tool 200 examines the list of a finite number of pre-defined and built-in server-functionality roles and determines which ones are currently installed.

At 606, the tool 200 discovers the registered extension server-functionality roles. If not already loaded, the tool loads the associated file(s) of the discovered extension roles and determines its installation status.

At 608, the tool acquires role-management information from each discovered extension role and displays that information on the UI associated with its role. The tool may acquire this information from a role by querying its associated file(s).

Exemplary Computing System and Environment

FIG. 7 illustrates an example of a suitable computing environment 700, within which an exemplary server-role configuration and management tool, such as the tool 200 for configuration and management of server-functionality roles as described herein, may be implemented (either fully or partially). The computing environment 700 may be utilized in the computer and network architectures described herein.

The exemplary computing environment 700 is only one example of a computing environment and is not intended to suggest any limitation as to the scope of use or functionality of the computer and network architectures. Neither should the computing environment 700 be interpreted as having any dependency or requirement relating to any one or combination of components illustrated in the exemplary computing environment 700.

The exemplary server-role configuration and management tool may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, personal digital assistants (PDA), appliances, special-purpose electronics (e.g., a DVD player), programmable consumer electronics, network PCs, minicomputers, mainframe computers, distributed computing environments that include any of the above systems or devices, and the like.

The exemplary server-role configuration and management tool may be described in the general context of computer-executable instructions, such as program modules, being executed by a computer. Generally, program modules include routines, programs, objects, components, data structures, etc. that perform particular tasks or implement particular abstract data types. The exemplary server-role configuration and management tool may also be practiced in distributed computing environments where tasks are performed by remote processing devices that are linked through a data-communications network. In a distributed computing environment, program modules may be located in both local and remote computer storage media including memory storage devices.

The computing environment 700 includes a general-purpose computing device in the form of a computer 702. The components of computer 702 may include, but are not limited to, one or more processors or processing units 704, a system memory 706, and a system bus 708 that couples various system components, including the processor 704, to the system memory 706.

The system bus 708 represents one or more of any of several types of bus structures, including a memory bus or memory controller, a peripheral bus, an accelerated graphics port, and a processor or local bus using any of a variety of bus architectures. By way of example, such architectures can include a CardBus, Personal Computer Memory Card International Association (PCMCIA), Accelerated Graphics Port (AGP), Small Computer System Interface (SCSI), Universal Serial Bus (USB), IEEE 1394, a Video Electronics Standards Association (VESA) local bus, and a Peripheral Component Interconnects (PCI) bus, also known as a Mezzanine bus.

Computer 702 typically includes a variety of computer-readable media. Such media may be any available media that is accessible by computer 702 and includes both volatile and non-volatile media, removable and non-removable media.

The system memory 706 includes computer-readable media in the form of volatile memory, such as random access memory (RAM) 710, and/or non-volatile memory, such as read only memory (ROM) 712. A basic input/output system (BIOS) 714, containing the basic routines that help to transfer information between elements within computer 702, such as during start-up, is stored in ROM 712. RAM 710 typically contains data and/or program modules that are immediately accessible to and/or presently operated on by the processing unit 704.

Computer 702 may also include other removable/non-removable, volatile/non-volatile computer storage media. By way of example, FIG. 7 illustrates a hard disk drive 716 for reading from and writing to a non-removable, non-volatile magnetic media (not shown), a magnetic disk drive 718 for reading from and writing to a removable, non-volatile magnetic disk 720 (e.g., a "floppy disk"), and an optical disk drive 722 for reading from and/or writing to a removable, non-volatile optical disk 724 such as a CD-ROM, DVD-ROM, or other optical media. The hard disk drive 716, magnetic disk drive 718, and optical disk drive 722 are each connected to the system bus 708 by one or more data media interfaces 725.

Alternatively, the hard disk drive 716, magnetic disk drive 718, and optical disk drive 722 may be connected to the system bus 708 by one or more interfaces (not shown).

The disk drives and their associated computer-readable media provide non-volatile storage of computer readable instructions, data structures, program modules, and other data for computer 702. Although the example illustrates a hard disk 716, a removable magnetic disk 720, and a removable optical disk 724, it is to be appreciated that other types of computer-readable media, which may store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, may also be utilized to implement the exemplary computing system and environment.

Any number of program modules may be stored on the hard disk 716, magnetic disk 720, optical disk 724, ROM 712, and/or RAM 710, including, by way of example, an operating system 726, one or more application programs 728, other program modules 730, and program data 732.

A user may enter commands and information into computer 702 via input devices, such as a keyboard 734 and a pointing device 736 (e.g., a "mouse"). Other input devices 738 (not shown specifically) may include a microphone, joystick, game pad, satellite dish, serial port, scanner, and/or the like. These and other input devices are connected to the processing unit 704 via input/output interfaces 740 that are coupled to the system bus 708, but may be connected by other interface and bus structures, such as a parallel port, game port, or a universal serial bus (USB).

A monitor 742 or other type of display device may also be connected to the system bus 708 via an interface, such as a video adapter 744. In addition to the monitor 742, other output peripheral devices may include components, such as speakers (not shown) and a printer 746, which may be connected to computer 702 via the input/output interfaces 740.

Computer 702 may operate in a networked environment using logical connections to one or more remote computers, such as a remote computing device 748. By way of example, the remote computing device 748 may be a personal computer, a portable computer, a server, a router, a network computer, a peer device or other common network node, and the like. The remote computing device 748 is illustrated as a portable computer that may include many or all of the elements and features described herein, relative to computer 702.

Logical connections between computer 702 and the remote computer 748 are depicted as a local area network (LAN) 750 and a general wide area network (WAN) 752. Such networking environments are commonplace in offices, enterprise-wide computer networks, intranets, and the Internet. Such networking environments may be wired or wireless.

When implemented in a LAN networking environment, the computer 702 is connected to a local network 750 via a network interface or adapter 754. When implemented in a WAN networking environment, the computer 702 typically includes a modem 756 or other means for establishing communications over the wide network 752. The modem 756, which may be internal or external to computer 702, may be connected to the system bus 708 via the input/output interfaces 740 or other appropriate mechanisms. It is to be appreciated that the illustrated network connections are exemplary and that other means of establishing communication link(s) between the computers 702 and 748 may be employed.

In a networked environment, such as that illustrated with computing environment 700, program modules depicted, relative to the computer 702 or portions thereof, may be stored in a remote memory storage device. By way of example, remote application programs 758 reside on a memory device of remote computer 748. For purposes of illustration, application programs and other executable program components, such as the operating system, are illustrated herein as discrete blocks, although it is recognized that such programs and components reside, at various times, in different storage components of the computing device 702, and are executed by the data processor(s) of the computer.

Computer-Executable Instructions

An implementation of an exemplary server-role configuration and management tool may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 7 illustrates an example of a suitable operating environment 700, in which an exemplary server-role configuration and management tool may be implemented. Specifically, the exemplary server-role configuration and management tool(s) described herein may be implemented (wholly or in part) by any program modules 728-730 and/or operating system 726 in FIG. 7 or a portion thereof.

The operating environment is only an example of a suitable operating environment and is not intended to suggest any limitation as to the scope or use of functionality of the exemplary server-role configuration and management tool(s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipment, general and special-purpose appliances, application-specific integrated circuits (ASICs), network PCs, minicomputers, mainframe computers, distributed computing environments that include any of the above systems or devices, and the like.

Computer-Readable Media

An implementation of an exemplary server-role configuration and management tool may be stored on, or transmitted across, some form of computer-readable media. Computer-readable media may be any available media that may be accessed by a computer. By way of example, computer-readable media may comprise, but is not limited to, "computer storage media" and "communications media."

"Computer storage media" include volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

"Communication media" typically embodies computer-readable instructions, data structures, program modules, or other data in a modulated data signal, such as carrier wave or other transport mechanism. Communication media also includes any information delivery media.

CONCLUSION

The techniques, described herein, may be implemented in many ways, including (but not limited to) program modules, general- and special-purpose computing systems, network servers and equipment, dedicated electronics and hardware, and as part of one or more computer networks. The techniques may, for example, be implemented on a computer system depicted in FIG. 7.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. In a network server having a set of built-in server-functionality roles available for configuration or management, a method comprising the following acts performed locally by the network server:

discovering what, if any, extension server-functionality roles of a set of extension roles are available on the network server by examining one or more registries stored in a computer storage, wherein the extension server-functionality roles are to be performed by the network server;

loading dynamic link library files associated with the discovered extension server-functionality roles;

producing a user-interface (UI) which is local to the network server and lists members of both the set of built-in server-functionality roles and the discovered extension server-functionality roles;

in response to a user selection of one of the discovered extension server-functionality roles, signaling one or more program modules associated with the selected extension role to perform a procedure for configuration or management of the selected extension role.

2. A method as recited in claim 1 further comprising determining which built-in server-functionality roles of the set of built-in roles are installed on the network server.

3. A method as recited in claim 1 further comprising determining which extension server-functionality roles of the set of available extension roles are installed on the network server.

4. A method as recited in claim 1 further comprising receiving status update regarding the performance of the procedure for configuration or management of the selected extension role.

5. A method as recited in claim 1 further comprising acquiring and displaying role-management information from each of the discovered extension server-functionality roles.

6. A method as recited in claim 1 further comprising acquiring descriptive-data about one or more of the discovered extension server-functionality roles.

7. A method as recited in claim 1, wherein discovering comprise examining one or more configuration files in which extension server-functionality roles of a set of extension roles are defined as being available on the network server.

8. One or more computer-readable storage media having computer-executable instructions thereon that, when executed by a network server, perform a method comprising the acts of:

discovering what, if any, extension server-functionality roles of a set of extension roles are available on the network server by examining one or more registries stored in a computer storage, wherein the extension server-functionality roles are to be performed by the network server;

loading dynamic link library files associated with the discovered extension server-functionality roles;

producing a user-interface (UI) which is local to the network server and lists members of both the set of built-in server-functionality roles and the discovered extension server-functionality roles;

in response to a user selection of one of the discovered extension server-functionality roles, signaling one or more program modules associated with the selected extension role to perform a procedure for configuration or management of the selected extension role.

9. One or more media as recited in claim 8 further comprising receiving status update regarding the performance of the procedure for configuration or management of the selected extension role.

10. One or more media as recited in claim 8 further comprising acquiring and displaying role-management information from each of the discovered extension server-functionality roles.

11. One or more media as recited in claim 8 further comprising acquiring descriptive-data about one or more of the discovered extension server-functionality roles.

12. One or more media as recited in claim 8, wherein discovering comprise examining one or more configuration files in which extension server-functionality roles of a set of extension roles are defined as being available on the network server.

* * * * *